(12) United States Patent
Ng et al.

(10) Patent No.: US 7,289,734 B2
(45) Date of Patent: Oct. 30, 2007

(54) METHOD AND SYSTEM FOR MULTI-LEVEL POWER MANAGEMENT IN AN OPTICAL NETWORK

(75) Inventors: Eddie Kai Ho Ng, Ottawa (CA); Michael Joseph McCloskey, Ottawa (CA)

(73) Assignee: Tropic Networks Inc., Kanata, Ontario (CA)

( * ) Notice: Subject to any disclaimer, the term of this patent is extended or adjusted under 35 U.S.C. 154(b) by 645 days.

(21) Appl. No.: 10/638,378

(22) Filed: Aug. 12, 2003

(65) Prior Publication Data

US 2004/0120712 A1 Jun. 24, 2004

Related U.S. Application Data

(60) Provisional application No. 60/435,859, filed on Dec. 24, 2002.

(51) Int. Cl.
*H04J 14/08* (2006.01)

(52) U.S. Cl. .............................. 398/94; 398/38; 398/213

(58) Field of Classification Search .................... 398/4, 398/5, 38, 94, 213
See application file for complete search history.

(56) References Cited

U.S. PATENT DOCUMENTS

| 6,134,036 | A  | * | 10/2000 | Andreozzi et al. | ............. 398/1 |
| 6,292,290 | B1 | * | 9/2001  | Wan et al. | ................ 359/337.1 |
| 6,304,347 | B1 | * | 10/2001 | Beine et al. | .................. 398/38 |
| 6,459,516 | B1 | * | 10/2002 | Mizrahi et al. | ............... 398/82 |
| 6,539,148 | B1 | * | 3/2003  | Kim et al. | ..................... 385/27 |
| 2002/0141047 | A1 | * | 10/2002 | Vusirikala et al. | .......... 359/349 |
| 2003/0053163 | A1 |   | 3/2003  | Li et al. | |
| 2003/0133713 | A1 |   | 7/2003  | Ng et al. | |
| 2004/0208531 | A1 | * | 10/2004 | Bosloy et al. | ................ 398/33 |

* cited by examiner

*Primary Examiner*—Leslie Pascal
(74) *Attorney, Agent, or Firm*—Victoria Donnelly

(57) ABSTRACT

A method and system for multi-level power management in an optical network is provided. They include three levels of power equalization. The first level of power management equalizes the powers of channels in a band of channels. The second level of power management equalizes the average powers of bands of channels on a fiber. The third level of control equalizes the powers of bands of channels on working and protection fibers for a path in the optical network. As a result, this multi-level power management in the network provides a dynamic, automatic method for the network to adjust to changing operating conditions and configurations and to maintain relatively stable network powers. Each level of power management may be implemented jointly or independently, and operates autonomously so that, for example, one modification comprises continuous first level control and only periodic second level control.

15 Claims, 3 Drawing Sheets

(a)             (b)

METHOD AND SYSTEM FOR MULTI-LEVEL POWER MANAGEMENT IN AN OPTICAL NETWORK

RELATED APPLICATION

This application claims benefit of U.S. provisional application to Ng et al. entitled "System and Method for Power Management in an Optical Network" Ser. No. 60/435,859 filed on 24 Dec. 2002.

FIELD OF THE INVENTION

The present invention relates to optical networks, and in particular, to a method and system for multi-level power management in an optical network.

BACKGROUND OF THE INVENTION

Optical telecommunications networks are growing increasingly complex, developing beyond simple passive transport of signals to dynamic routing of the signals. A main objective of power management in these dynamic networks, for example metropolitan area networks (MANs), is the management of network power levels during adding and dropping of channels, network upgrades and reconfigurations. Several methods of such power monitoring and management in optical networks are currently available.

The U.S. patent application No. 20030053163 to Li et al. dated Mar. 20, 2003 and entitled "Analogous Channel Method for Performance Monitoring and Equalization in Optical Networks", discloses a method of monitoring and equalizing dense wavelength division multiplexing (DWDM) optical links by adjusting input power. In this method, the input power is adjusted to optimize optical network parameters such as optical signal to noise ratio (OSNR) and bit error rate (BER). This requires the complex and costly monitoring of the optical network parameters.

The U.S. Pat. No. 6,304,347 to Beine et al. issued Oct. 16, 2001 and entitled "Optical Power Management in an Optical Network", discloses a method of managing power levels in a network by providing the nodes of the network with parameters to configure the node. The input powers to each node are maintained at a constant level by adjustment of the node configuration parameters. Thus, this patent provides management of network power by strictly maintaining constant power levels at specific points in the network, requiring many monitored points and the exchange of information between network components.

The U.S. patent application No. 20030133713 to Ng et al. dated Jul. 17, 2003 and entitled "Method and System for Multi-Level Power Management in an Optical Network", discloses a method of managing power levels in a network through multi-level control of amplifier gain settings. This patent is concerned only with the effects of amplifiers on variation of signal power levels and does not correct for power variation due to any other effects.

Therefore, there is a need in industry for the development of an improved method for simple yet comprehensive power management in an optical network.

SUMMARY OF THE INVENTION

Therefore there is an object of the invention to provide a method and system for multi-level power management in an optical network that would avoid or minimize the above-mentioned drawbacks.

According to one aspect of the invention, there is provided a method for automatic multi-level power management in an optical network, comprising the steps of:

(a) changing powers of channels in a band of channels in the optical network so as to provide that power variation between the channels in the band of channels is within a first predetermined power range around an average power selected for the band of channels;

(b) changing average powers of bands of channels on a fiber in the optical network so as to provide that variation of the average power between the bands of channels on the fiber is within a second predetermined power range around an average power selected for the fiber; and (c) changing average powers of bands of channels on working and protection fibers for a path in the optical network so as to provide that variation of the average power between bands of channels on the working and protection fibers is within a third predetermined power range around an average power selected for the path.

The step (a) of changing powers of channels may comprise changing powers of channels in the band so as to provide that all channels in the band have substantially equal power. As well, the step (b) of changing average powers of bands of channels on the fiber may comprise changing average powers of bands of channels on the fiber so as provide that all bands on the fiber have substantially equal average power. In addition, the step (c) of changing average powers of bands of channels on working and protection fibers for the path may comprise changing average powers of bands of channels on the working and protection fibers so as to provide that they have substantially equal power and are equal to the selected average power for the path.

Beneficially, the step (a) of changing powers of channels may comprise changing powers of channels in the band so as to provide that the power of each channel is substantially equal to the initial average power of the band of channels.

Furthermore, the step (b) of changing average powers of bands of channels on the fiber may comprise changing average powers of newly added bands to the fiber so as to provide that the average power for each newly added band is substantially equal to the average power of existing bands on the fiber.

Moreover, the step (c) of changing average powers of bands on working and protection fibers may comprise setting the average power selected for the path to be substantially equal to the lowest between the average power of bands on the working fiber and the average power of bands on the protection fiber.

According to one embodiment, the step (a) of changing powers of channels comprises changing powers of channels continuously. In a modification to the method of the embodiment of the invention, the step (b) of changing average powers of bands of channels on the fiber comprises changing the average powers of bands of channels on the fiber periodically or in response to a signal that is an automatically generated signal or a signal generated by a user.

In yet another modification to the method of the embodiment of the invention, the step (c) of changing average powers of bands of channels on working and protection fibers for a path comprises changing the average powers of bands of channels on said fibers periodically or in response to a signal that is an automatically generated signal or a signal generated by a user.

In a further modification to the method of the embodiment of the invention, the step (a) of changing powers of channels comprises changing powers of channels so as to provide that power variation between the channels is within the first predetermined power range at the egress of a node. Also, the step (b) of changing average powers of bands on the fiber comprises changing average powers of bands on the fiber so as to provide that variation of the average power between the bands on the fiber is within the second predetermined power range at the input to a broadband amplifier. Finally, the step (c) of changing average powers of bands on the working and protection fibers comprises changing average powers of bands on the working and protection fibers so as to provide that power variation between said average powers is within the third predetermined power range at the inputs to a switch between the working and protection fibers.

According to another aspect of the invention, there is provided a system for automatic multi-level power management in an optical network, comprising:

(a) means for changing powers of channels in a band of channels in the optical network so as to provide that power variation between the channels in the band of channels is within a first predetermined power range around an average power selected for the band of channels;

(b) means for changing average powers of bands of channels on a fiber in the optical network so as to provide that variation of the average power between the bands of channels on the fiber is within a second predetermined power range around an average power selected for the fiber; and (c) means for changing average powers of bands of channels on working and protection fibers for a path in the optical network so as to provide that variation of the average power between bands of channels on the working and protection fibers is within a third predetermined power range around an average power selected for the path.

The means (a) for changing powers of channels may comprise means for changing powers of channels in the band so as to provide that all channels in the band have substantially equal power. Also, the means (b) for changing average powers of bands of channels on the fiber may comprise means for changing average powers of bands of channels on the fiber so as provide that all bands on the fiber have substantially equal average power. As well, the means (c) for changing average powers of bands of channels on working and protection fibers for the path may comprise means for changing average powers of bands of channels on the working and protection fibers so as to provide that they have substantially equal power and are equal to the selected average power for the path.

In a modification to the system of the embodiment of the invention:

the means (a) for changing powers of channels comprises means for changing powers of channels so as to provide that power variation between the channels is within a predetermined power range at the egress of a node;

the means (b) for changing average powers of bands on the fiber comprises means for changing average powers of bands on the fiber so as to provide that variation of the average power between the bands on the fiber is within a predetermined power range at the input to a broadband amplifier; and the means (c) for changing average powers of bands on the working and protection fibers comprises means for changing average powers of bands on the working and protection fibers so as to provide that power variation between said average powers is within a predetermined power range at the inputs to a switch between the working and protection fibers.

The method and system for multi-level power management in an optical network of the embodiment of the invention provide the following advantages. By automatically changing power levels between channels in the band, between bands on the fiber, and between bands on the working and protection fibers to provide they are within predetermined ranges, power fluctuations and disruptions due to incremental as well as operational changes in the network are reduced. As well, by maintaining the required power levels on protection fibers, the network is ready for protection switching events. Finally, the layered structure of the power management in the network as described above allows for independent implementation of each layer of the power management.

BRIEF DESCRIPTION OF THE DRAWINGS

Embodiments of the invention will now be described, by way of example, with reference to the accompanying drawings in which.

DESCRIPTION OF THE SPECIFIC EMBODIMENTS

Figure 1:
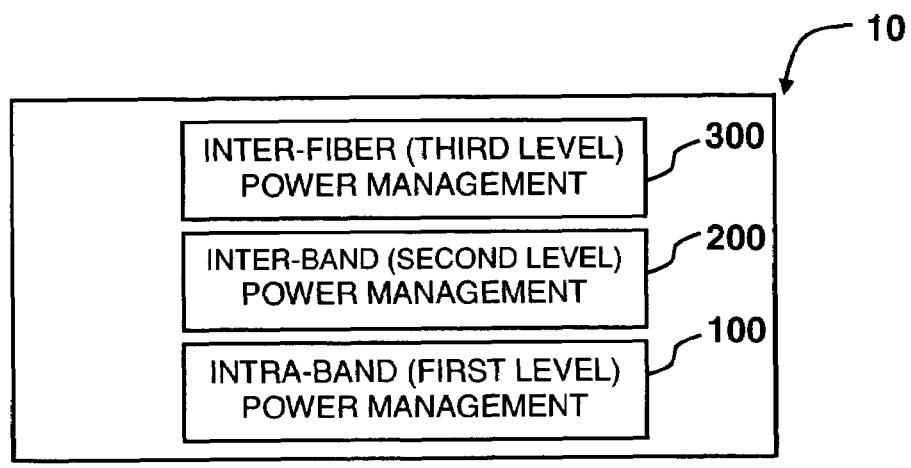
FIG. 1 is a diagram illustrating layers of multi-level power management in an optical network according to the embodiment of the invention.

A system 10 for multi-level power management in an optical network, according to the embodiment of the invention, is illustrated with the aid of FIGS. 1 to 5. The system 10 comprises three sub-systems: the sub-system 100 of the first level, the sub-system 200 of the second level, and the sub-system 300 of the third level, as shown in FIG. 1.

The sub-systems of the first, second, and third levels (100, 200, and 300 respectively) provide power management of channels in the network within a band of channels (intra-band), between bands of channels on a fiber (inter-band), and between fibers (inter-fiber) respectively. Thus, each sub-system performs a different aspect of power management in the network, the details of which will be described below.

Figure 2:
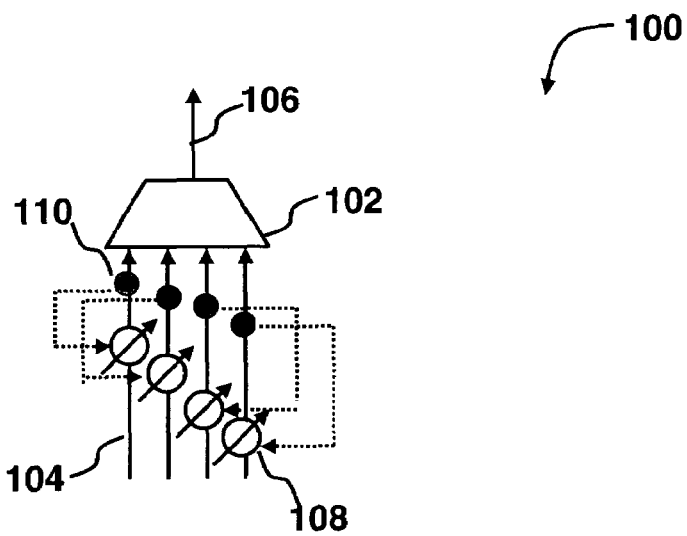
FIG. 2 shows an exemplary sub-system providing a first level power management illustrated in FIG. 1.
Figure 3:
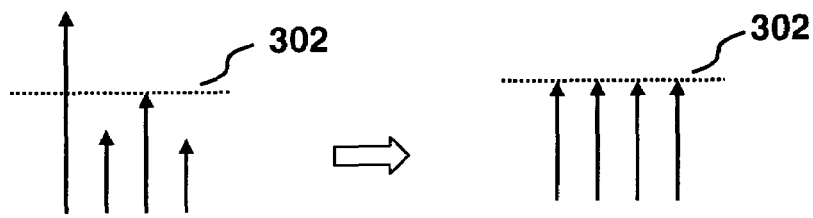
FIGS. 3(a) and 3(b) illustrate power levels of optical channels before (FIG. 3(a)) and after (FIG. 3(b)) applying the first level power management provided by the sub-system of FIG. 2 to a band of channels.

The first level of power management provides changing powers of channels in a band of channels in the optical network so as to provide that power variation for the channels in the band of channels is within a first predetermined power range around an average power selected for the band of channels. FIG. 2 illustrates an exemplary sub-system 100 providing the first level power management in the optical network. It includes an optical multiplexer 102, receiving a plurality of channels 104 at its input and transmitting a multiplexed signal 106 to its output. Each input channel passes through an optical attenuator 108 and power monitor 110 before entering the optical multiplexer 102. The power monitors 110 may be detectors such as PIN photodiodes, and they may be placed elsewhere in the network, such as at the output of the optical multiplexer 102 or egress of a node.

The sub-system 100 providing the first level power management of the optical network operates as follows. The attenuations of the optical attenuators 108 are adjusted so that the power levels of the signals 104 at the input to the optical multiplexer 102 are substantially equal. For example, the power levels of the channels 104 may be adjusted to be substantially equal to the average of the power levels before the adjustment. This example is illustrated in the FIG. 3, which shows the power levels of channels 104 at the input of the multiplexer 102 before (FIG. 3(a)) and after (FIG. 3(b)) applying the first level power management to the band of channels. The dotted lines show the average powers 302 of the channels 104 and they remain the same before (FIG. 3(a)) and after (FIG. 3(b)) the power level adjustment.

Figure 4:
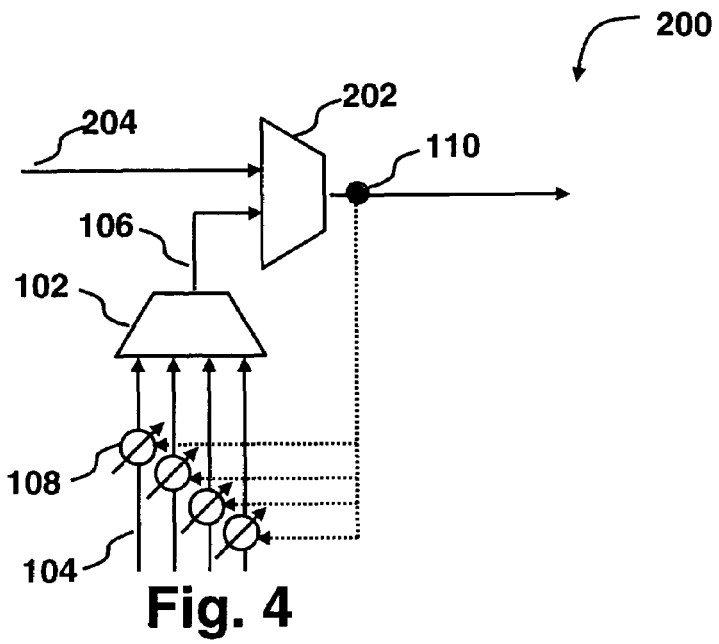
FIG. 4 shows an exemplary sub-system providing a second level power management illustrated in FIG. 1.
Figure 5:
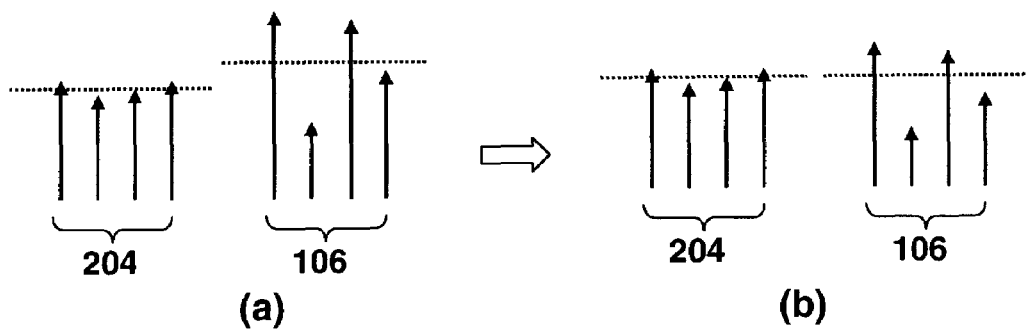
FIGS. 5(a) and 5(b) illustrate power levels of bands of channels before (FIG. 5(a)) and after (FIG. 5(b)) applying the second level power management provided by the sub-system of FIG. 4 to bands of channels on a fiber.

The second level of power management provides changing average powers of bands of channels on a fiber in the optical network so as to provide that variation of the average power between the bands of channels on the fiber is within a second predetermined power range around an average power selected for the fiber. FIG. 4 illustrates an exemplary sub-system 200 providing the second level power management in the optical network. It includes an optical multiplexer 202 receiving a plurality of multiplexed signals 204 at its input, one 106 of which is a newly added band of multiplexed channels. A power monitor 110 is located at the output of the optical multiplexer 202. The power monitor 110 may also be advantageously located at the input to a broadband amplifier as it would be important for signal powers entering the broadband amplifier to be equalized.

The sub-system 200 providing the second level power management of the optical network operates as follows. The attenuations of the optical attenuators 108 are adjusted so that the average power level of the newly added band of multiplexed channels 106 is substantially equal to the average power levels of the existing bands 204 at the input to the optical multiplexer 202. This example is illustrated in the FIG. 5, which shows the power levels of bands 106 and 204 at the input to the multiplexer 202 before (FIG. 5(a)) and after (FIG. 5(b)) applying the second level power management to the bands of channels on the fiber. The dotted lines show the average powers of the bands of multiplexed channels. As can be seen in the figure, only the average power of the newly added band 106 is changed, and it is it changed so that its average power level is substantially equal to the average power level of the existing band of multiplexed channels 204.

The third level of power management provides changing average powers of bands of channels on working and protection fibers for a path in the optical network so as to provide that power variation of the average power between the bands of channels on the working and protection fibers is within a third predetermined power range around an average power selected for the path. The working fibers are the fibers over which channels are transmitted during normal operation of the optical network. The protection fibers are the fibers over which channels are transmitted when there is a fault in the network preventing the transmission of channels along the working fibers, for example a break in the working fibers or malfunctioning equipment along the path of the working fibers.

Figure 6:
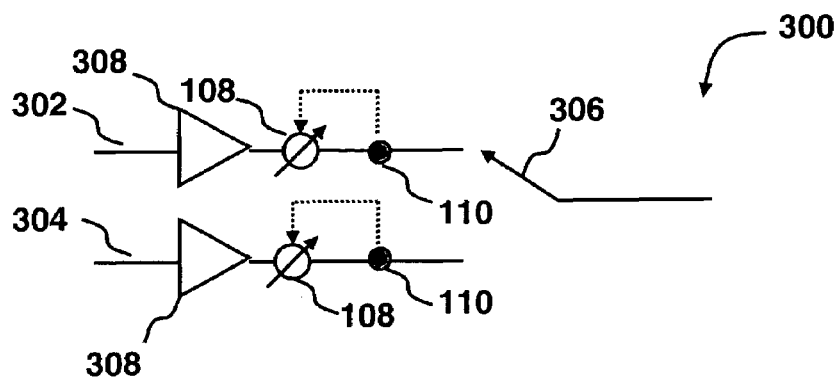
FIG. 6 shows an exemplary sub-system providing a third level power management illustrated in FIG. 1.

FIG. 6 illustrates an exemplary sub-system 300 providing the third level power management in the optical network. It includes a working fiber 302 and a protection fiber 304, one of which can be connected at a time through a single protection switch 306 to the rest of the network. On each path 302 and 304 is an optical attenuator 108 and a power monitor 110, located just prior to the protection switch 306.

Figure 7:
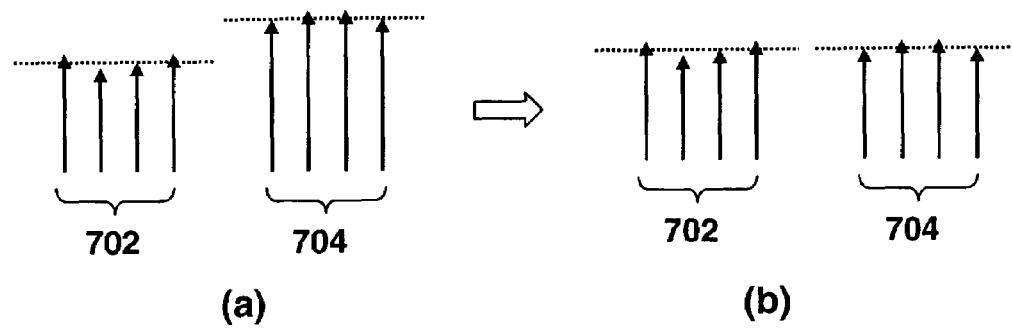
FIGS. 7(a) and 7(b) illustrate power levels of bands of channels on working and protection fibers before (FIG. 7(a)) and after (FIG. 7(b)) third level power management provided by the sub-system of FIG. 6 to the working and protection fibers.

The sub-system 300 providing the third level control of the optical amplifier operates as follows. The attenuations of the optical attenuators 108 are adjusted so that the average power selected for the path is substantially equal to the lowest between the average power of bands on the working fiber 302 and the average power of bands on the protection fiber 304. This example is illustrated in the FIG. 7, which shows the power levels 702 and 704 of bands of channels on working 304 and protection 306 fibers respectively at the power monitored point before (FIG. 7(a)) and after (FIG. 7(b)) applying third level power management to the working and protection fibers. As can be seen in the figure, only the average power of the higher power fiber 306 is changed, and it is it attenuated to be substantially equal to the average power level of the lowest power fiber 304.

Thus, a system for multi-level power management in an optical network is provided including three subsystems 100, 200, and 300 for intra-band, inter-band, and inter-fiber power management respectively of an optical network.

Figure 8:
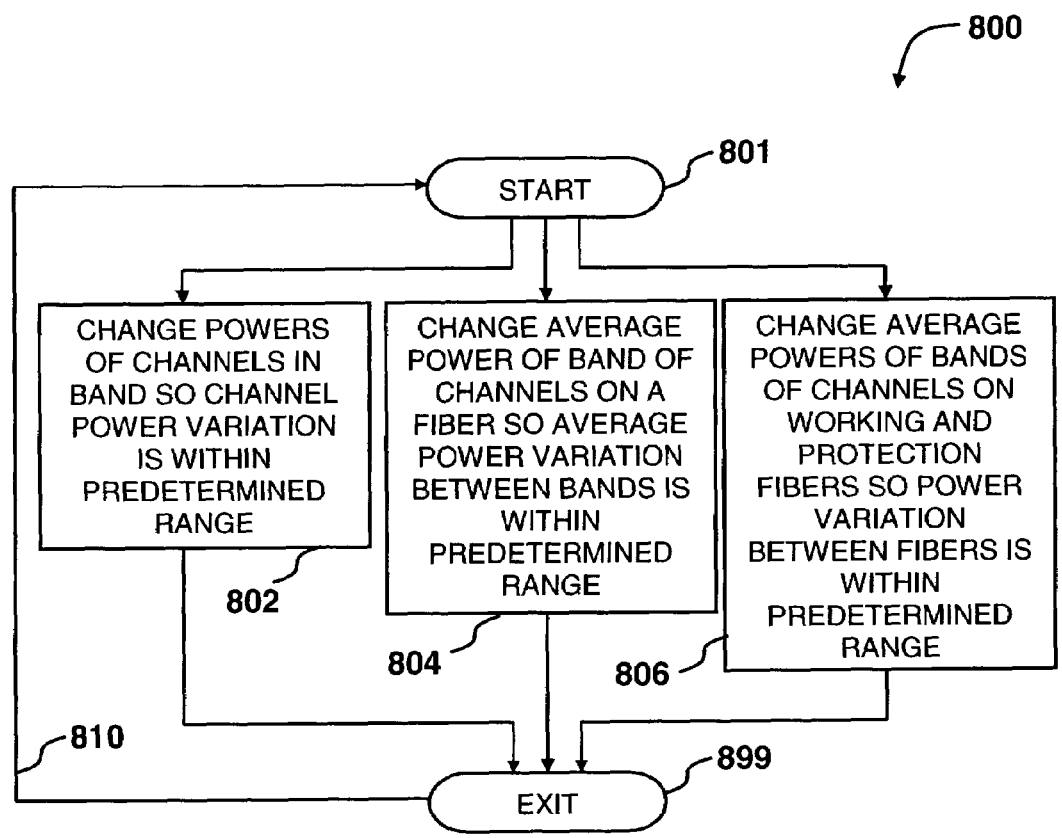
FIG. 8 is a diagram illustrating the steps of the method for multi-level power management in the optical network.

FIG. 8 is a diagram 800 illustrating the steps of the method for multi-level power management in the optical network performed in the system of FIG. 1. Upon start (step 801), the procedure 800 performs the three steps 802, 804, and 806 simultaneously or in any order. The step 802 changes powers of channels in a band of channels in the optical network so as to provide that power variation between the channels in the band of channels is within the first predetermined power range and is performed by the subsystem 100.

The step 804 changes average powers of bands of channels on a fiber in the optical network so as to provide that variation of the average power between the bands of channels on the fiber is within the second predetermined power range and is performed by the subsystem 200.

The step 806 changes average powers of bands of channels on working and protection fibers for a path in the optical network so as to provide that average power variation between bands of channels on the working and protection fibers is within the third predetermined power range and is performed by the subsystem 300.

When all three steps 802, 804, and 806 are performed, the procedure 800 cycles through these steps (routine 810) during operation of the network or exits (step 899) otherwise.

In one embodiment, one or more of the steps 802, 804, and 806 of changing powers comprises changing powers of channels continuously. In a modification to the above embodiment, one or more of the steps 802, 804, and 806 of changing powers may comprise changing powers of channels periodically. In yet another modification to the above embodiment, one or more of the steps 802, 804, and 806 of changing powers may comprise changing powers of channels only in response to a signal. The signal may be generated by a user or it may generated automatically, for example by a network management system.

The described system and method for multi-level power management in an optical network have the following advantages.

By automatically changing power levels between channels in the band, between bands on the fiber, and between bands on the working and protection fibers to provide they are within predetermined ranges, power fluctuations and disruptions in the network are reduced. These power fluctuations and disruptions may be due to incremental changes such as adding and dropping of channel, as well as to general operation of the network and the associated effects of component aging and temperature drifts. As well, by maintaining the required power levels on protection fibers, the network is ready for protection switching events.

Additionally, the layered structure of the power management in the network as described above allows for independent implementation of each layer of the power management. For example, each level of power management may be facilitated through adjustment of its own set of optical attenuators 108, or alternatively all levels of power management may be facilitated through adjustment of one single set of optical attenuators 108.

It is apparent to those skilled in the art that there are many variations of the present invention that retain the spirit of the invention. Thus it is intended that the present invention covers the modifications, variations, and adaptations of this invention provided they fall within the scope of the following claims.

What is claimed is:

1. A method for automatic multi-level power management in an optical network, comprising the steps of:
   (a) controlling attenuation of attenuators on each channel to change powers of channels in a band of channels in the optical network so as to provide that power variation between the channels in the band of channels is within a predetermined power range around an average power selected for the band of channels;
   (b) controlling attenuation of the attenuators on each channel to change average powers of newly added bands of channels to the fiber so as to provide that the average power for each newly added band is substantially equal to the average power of existing bands on the fiber; and
   (c) controlling attenuation of the attenuators on each channel to change the average power of bands of channels on working and protection fibers for a path in the optical network so as to provide that the average power of the bands of channels on the working and protection fibers is substantially equal to the lowest between the existing average power of bands on the working fiber and the existing average power of bands on the protection fiber;
   wherein the same said attenuators are controlled by steps (a), (b), and (c); and
   wherein the same said attenuators are controlled simultaneously through adjustment of attenuations.

2. A method as described in claim 1, wherein the step (a) comprises controlling attenuation of the attenuators to change powers of channels in the band so as to provide that all channels in the band have substantially equal power.

3. A method as described in claim 2, wherein the step (a) comprises controlling attenuation of the attenuators to change powers of channels so as to provide that power variation between the channels is within the predetermined power range at the egress of a node.

4. A method as described in claim 3, wherein the step (b) comprises controlling attenuation of the attenuators to change the average powers of bands on the fiber so as to provide that the average power for each newly added band is substantially equal to the average power of existing bands on the fiber at the input to a broadband amplifier.

5. A method as described in claim 4, wherein the step (c) comprises controlling attenuation of the attenuators to change the average powers of bands on the working and protection fibers so as to provide that the average power of the bands of channels on the working and protection fibers is substantially equal to the lowest between the average power of bands on the working fiber and the average power of bands on the protection fiber at the inputs to a switch between the working and protection fibers. to provide that all channels in the band have substantially equal power.

6. A method as described in claim 2, wherein the step (a) comprises controlling attenuation of the attenuators to change powers of channels in the band so as to provide that the power of each channel is substantially equal to the initial average power of the band of channels.

7. A method as described in claim 1, wherein the step (b) comprises controlling attenuation of the attenuators in response to a signal to change the average powers of bands of channels on the fiber.

8. A method as described in claim 7, wherein the controlling attenuation of the attenuators to change the average powers of bands of channels in response to the signal comprises controlling attenuation of the attenuators to change the average powers of bands of channels in response to the signal, which is one of the following:
   an automatically generated signal; and
   a signal generated by a user.

9. A method as described in claim 1, wherein the step (c) comprises controlling attenuation of the attenuators periodically in time to change the average powers of bands of channels on said fibers.

10. A method as described in claim 1, wherein the step (c) comprises controlling attenuation of the attenuators in response to a signal to change the average powers of bands of channels on said fibers.

11. A method as described in claim 10, wherein the controlling attenuation of the attenuators to change the average powers of bands of channels in response to the signal comprises controlling attenuation of the attenuators to change the average powers of bands on the working and protection fibers in response to the signal, which is one of the following:
   an automatically generated signal; and
   a signal generated by a user.

12. A method as described in claim 1, wherein the step (a) comprises controlling attenuation of the attenuators continuously to change powers of channels.

13. A method as described in claim 1, wherein the step (b) comprises controlling attenuation of the attenuators periodically in time to change the average powers of bands of channels on the fiber.

14. A system for automatic multi-level power management in an optical network, comprising:
   (a) means for controlling attenuation of attenuators on each channel to change powers of channels in a band of channels in the optical network so as to provide that power variation between the channels in the band of channels is within a first predetermined power range around an average power selected for the band of channels;
   (b) means for controlling attenuation of the attenuators to change average powers of newly added bands of channels to the fiber so as to provide that the average power for each newly added band is substantially equal to the average power of existing bands on the fiber; and (c) means for controlling attenuation of the attenuators to change average powers of bands of channels on working and protection fibers for a path in the optical network so as to provide that the average power of the bands of channels on the working and protection fibers is substantially equal to the lowest between the existing average power of bands on the working fiber and the existing average power of bands on the protection fiber, wherein the means (a), (b), and (c) are used to control the same said attenuators; and wherein the means (a), (b), and (c) control the same said attenuators simultaneously through adjustment of attenuations.

15. A system as described in claim 14, wherein:

the means (a) comprises means for controlling attenuation of the attenuators to change powers of channels so as to provide that power variation between the channels is within a predetermined power range at the egress of a node;

the means (b) comprises means for controlling attenuation of the attenuators to change the average powers of bands on the fiber so as to provide that the average power for each newly added band is substantially equal to the average power of existing bands on the fiber at the input to a broadband amplifier; and the means (c) comprises means for controlling attenuation of the attenuators to change the average powers of bands on the working and protection fibers so as to provide that the average power of the bands of channels on the working and protection fibers is substantially equal to the lowest between the existing average power of bands on the working fiber and the existing average power of bands on the protection fiber at the inputs to a switch between the working and protection fibers.

* * * * *